United States Patent [19]

Niinomi et al.

[11] Patent Number: 4,541,770
[45] Date of Patent: Sep. 17, 1985

[54] ASSEMBLING OR PROCESSING SYSTEM

[75] Inventors: Tatsuya Niinomi; Yoshio Matsumo, both of Yokohama, Japan

[73] Assignee: Hitachi, Ltd., Tokyo, Japan

[21] Appl. No.: 552,795

[22] Filed: Nov. 17, 1983

Related U.S. Application Data

[63] Continuation of Ser. No. 321,672, Nov. 16, 1981, abandoned.

[30] Foreign Application Priority Data

Nov. 17, 1980 [JP] Japan ................................ 55-160789
Oct. 30, 1981 [JP] Japan ................................ 56-173016

[51] Int. Cl.⁴ .............................................. B66C 23/00
[52] U.S. Cl. .......................................... 414/730; 901/8
[58] Field of Search ................ 414/4, 5, 719, 730, 414/735, 731, 749, 751, 753, 589, 590, 917; 294/86 R; 212/153, 156, 160, 95, 233; 105/163 R, 177; 29/823, 824; 901/6, 8; 1/21

[56] References Cited

U.S. PATENT DOCUMENTS

| 4,177,002 | 12/1979 | Motoda et al. | 414/751 |
|---|---|---|---|
| 4,260,319 | 4/1981 | Motoda et al. | 414/730 |
| 4,347,578 | 8/1982 | Inaba | 414/730 |
| 4,384,397 | 5/1983 | Nelson | 414/736 |

FOREIGN PATENT DOCUMENTS 78265  5/1962  France .................................. 414/1

OTHER PUBLICATIONS

"Discover the Tomorrow Tool. Today.", Cincinnati Milacron, 1977, 8 pages.
"Effect of Hand-Based Sensors on Manipulator Control Performance", Mechanism and Machine Theory, 1977, vol. 12, pp. 547–567.

Primary Examiner—Robert J. Spar
Assistant Examiner—Donald W. Underwood
Attorney, Agent, or Firm—Antonelli, Terry & Wands

[57] ABSTRACT

A system for automatically assembling or processing a large variety of parts of different weights. The system has a first industrial robot whose end having at least three degrees of freedom for movement in horizontal and vertical planes, and a second industrial robot whose end having at least three degrees of freedom for movement in horizontal and vertical planes. The first and second industrial robots are connected to each other by connecting means which carries a sensor adapted to sense the difference of vertical position between the connecting ends of the first and second industrial robots. The operation of the first and second industrial robots is under the control of a controller. The first industrial robot is operated by an instruction given by the controller, while the second industrial robot is operated to follow-up the movement of the first industrial robot, in accordance with the signal derived from the sensor.

21 Claims, 16 Drawing Figures

ASSEMBLING OR PROCESSING SYSTEM

This is a continuation of application Ser. No. 321,672, filed Nov. 16, 1981 now abandoned.

BACKGROUND OF THE INVENTION

The present invention relates to an assembling or a processing system capable of assembling or processing various mechanical parts of a large variety of weight making use of a single industrial robot.

In recent years, there is an increasing demand for automation of large lot and small quantity production process, particularly in the assembling process for assembling various mechanical parts of a large variety of shape and weight. For automation of such an assembling process, hitherto, it has been necessary to employ specific assembling machine having a single function for each kind of parts to be assembled. In consequence, the whole assembling process requires a large number of assembling machines of different kinds to occupy an impractically large installation space. In addition, the rate of operation of each assembling machine is lowered impractically. Furthermore, the conventional automatic assembling system has small flexibility or adaptability to any change of the assembling procedure due to a change of the parts to be assembled or the like reason.

Under this circumstance, various attempts have been made to develop an assembling system incorporating an industrial robot, having a wide adaptability to a large variety of jobs and a high flexibility to cope with changes of the procedure. However, in the case where the parts to be assembled together has a wide variety of weights from several tens of grams to hundred kilograms or more for example, it is extremely difficult to conduct all tasks by a single robot, because of limitation in the specification of the robot. In such a case, therefore, it has been necessary to use a plurality of industrial robots such as an industrial robot for small weight and size and another industrial robot for large size and weight, so that each robot can handle the parts of weights meeting its specification.

In the assembling equipment incorporating a plurality of industrial robots, however, an uneconomically large installatoin space is required for installation of these robots. In addition, the rate of operation of each robot is impractically low.

For instance, a conventional system shown in FIG. 1, (which is disclosed in Japanese Patent Laid-Open No. 6271/1979) has a heavy duty robot A which is simple, less expensive and capable of handling heavy loads, and an indexing robot B adapted for indexing the wrist of the heavy duty robot A in the directions of X and Y axes. These robots A and B are connected to each other by a telescopic means 7. More specifically, the indexing robot (sub-robot) B includes a guiding device 10 adapted for horizontally guiding a holding portion 8 of the heavy duty robot (main robot) A which can move only in the direction of Z axis in accordance with an instruction given by a controller 1, and a driving controller 11 for controlling the horizontal running of the holding portion 8. In this system, the vertical movement of the holding portion 8 is achieved by the main robot, while the horizontal movement is effected by the sub-robot, so that the precise control of the transfer or convey of the object to the designated point is conducted by a system having a simple construction.

The guiding device 10 of the sub-robot B is constituted by four pillars 12 to 15 arranged in a parallelopiped form, four guide rails 16 to 19 carried by the pillars 12 to 15, and a running rail 20 adapted to linearly run along the parallel guide rails 16, 18. Running blocks 21, 22 adapted to run along the guide rails 16, 18 are secured to both ends of the running rail 20. The driving controller 11 of the sub-robot B includes a driving block 23 adapted to run linearly along the running rail 20, telescopic means 7 fixed to the lower face of the driving block 23 and to the holding portion 8 of the main robot A so as to mechanically connect the main robot A and the sub-robot B, driving device mounted in the driving block 23 and adapted to drive the latter, and driving devices mounted in the running blocks 21, 22 and adapted to drive these running blocks.

The driving controller 11 of the sub-robot is designed and arranged to permit the transportation of loads such as parts to any point within a predetermined area corresponding to the object of the task to be performed by the robot. In the system having the described construction, the vertical movement of the holding portion 8 achieved by actuating the driving box 1 of the main robot A in accordance with an instruction delivered by the control box. Therefore, the telescopic means 7 secured to the holding portion 8 caused by the main robot A. On the other hand, the horizontal movement of the holding portion 8 is achieved by linearly driving the running blocks 21, 22 and the driving block 23 along the guide rails 16, 18 and the running rail 20, respectively, by giving position data in X and Y axis directions to the driving controller 11 from the control box. Namely, as the driving block 23 is positively driven in the X and Y axis directions linearly, the holding portion 8 integrally attached to the driving block 23 is mvoed in the same direction in a passive manner. The horizontal movement of the holding portion 8 is thus performed.

In the assembling or processing system of the type described, the transportation of the load, i.e. parts, is divided into two separate tasks, i.e. the vertical movement and the horizontal movement, which are shared by different robots, i.e. the main robot and the sub-robot, operatively connected to each other, to transport the load precisely to the designated position.

In this system, however, the sub-robot B is an imperfect robot and cannot assemble or process light-weight articles by itself independently of the operation of the main robot. For this reason, the described system cannot have a sufficiently high flexibility to fail to deal with a large variety of tasks.

SUMMARY OF THE INVENTION

Accordingly, an object of the invention is to provide an automated assembling or processing system in which an industrial robot for light load is designed and constructed to be able to handle heavy parts so that the system can apply to the production of a large variety of products in small quantities.

To this end, according to the invention, the industrial robot for light load is constructed as a perfect industrial robot capable of conducting assembling or processing of light-weight parts by itself, without any assist by other robot or the like machine. When a heavy part of a weight exceeding the capacity of this industrial robot is to be handled, the perfect industrial robot is coupled to a balancer through a force sensor such that the balancer is controlled following up the movement of the industrial robot in accordance with a signal derived from the force sensor so that the heavy part is handled by a cooperation between the balancer and the industrial robot.

The industrial robot for light load is designed to have three degress of freedom to be able to move in X, Y and X axis directions, so that this robot may conduct an assembling or processing by itself by means of a chuck attachable thereto.

The carrying capacity of this robot is determined by the maximum weight liftable by this robot. However, by arranging such that a heavy part is lifted by a balancer which is controlled by the robot, it is possible to make the robot handle the heavy part of a weight exceeding the carrying capacity thereof. Usually, the balancer can freely moved in the horizontal plane in the direction of a force mechanically applied thereto, while the vertical movement of the balancer is effected by an actuator under the control of a balancer controller adapted to receive a predetermined instruction signal. According to the invention, the robot and the balancer are connected to each other at their ends, so that the end of the balancer is driven in the horizontal plane by the force generated by the robot, while, for the driving in the vertical plane, the robot is moved in the vertical direction and, at the same time, an operation instruction signal is given from the controller of the robot to the balancer controller to drive the actuator which in turn actuates the balancer in the vertical direction. Thus, the robot can control the position of the heavy part suspended from the balancer. In consequence, the robot can handle the heavy load of a weight exceeding its carrying capacity. During the vertical movement of the heavy parts, both of the robot and the balancer are driven. It is, therefore, essential to compensate for any difference in the response characteristics between both actuators, in order to maintain within an allowable level the force which is generated at the connecting ends of the robot and the balancer due to a difference in the position between the end of the robot and the end of the balancer. Such a compensation control can be achieved by sensing the difference of the positions of the robot end and the actuator end by a sensor, and successively changing the level of the instruction signal given to the balancer actuator in accordance with the signal from the sensor such that the difference is reduced or minimized.

The mechanism of the industrial robot is entirely different from that of the actuator. It is, therefore, difficult to obtain the coincidence of positions of the ends of the robot and the balancer by connecting them rigidly. In the assembling or processing system of the invention, therefore, the balancer is controlled following up the movement of the robot through detecting the difference by a pressure sensor connected between the robot and the balancer.

DETAILED DESCRIPTION OF THE PREFERRED EMBODIMENTS

Figure 1:
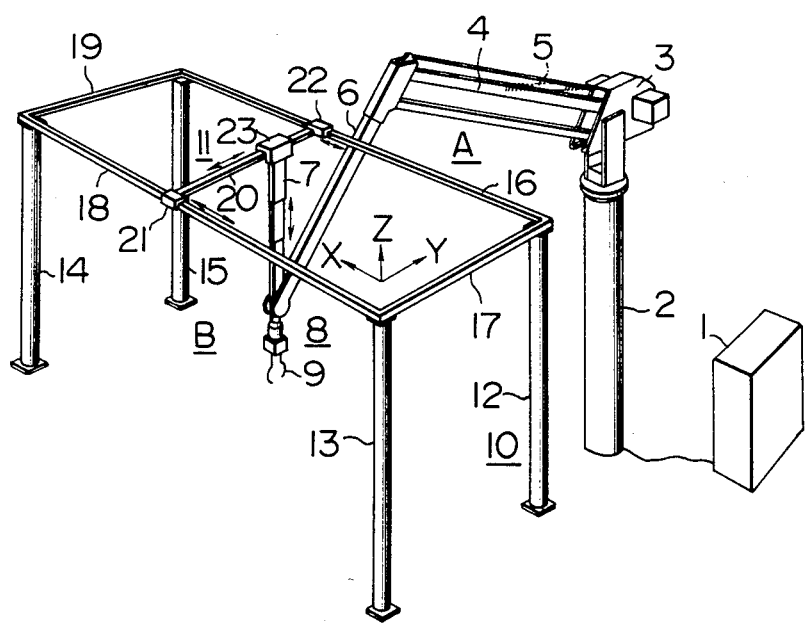
FIG. 1 is a schematic illustration of a conventional assembling or processing system.
Figure 2:
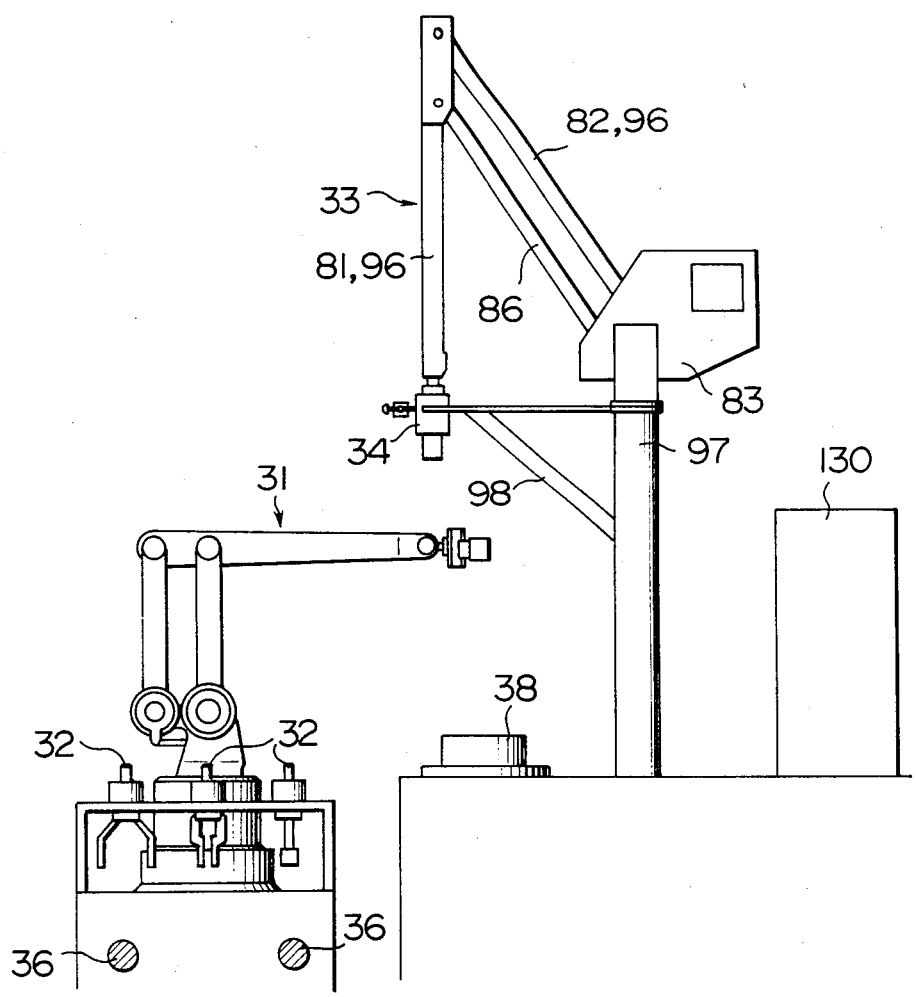
FIG. 2 is a schematic front elevational view of an assembling or processing system in accordance with an embodiment of the invention.
Figure 3:
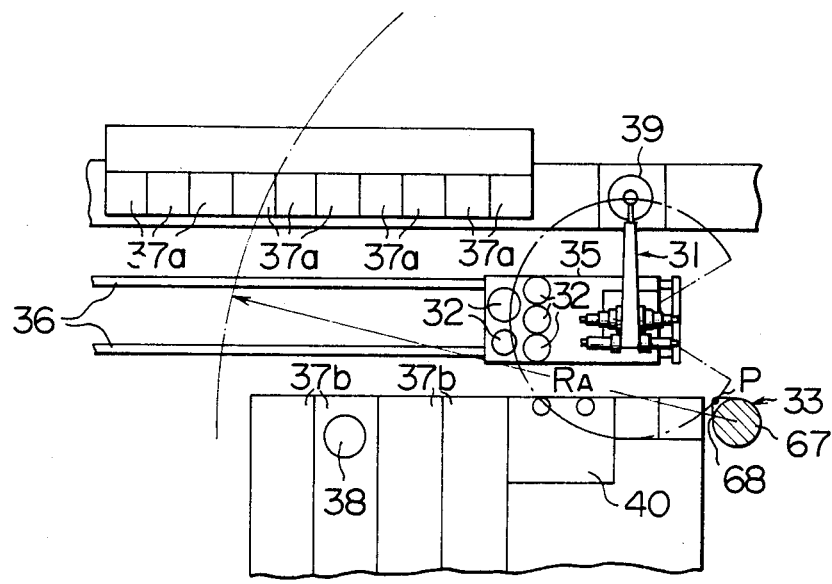
FIG. 3 is a schematic plan view of the system as shown in FIG. 2.
Figure 4:
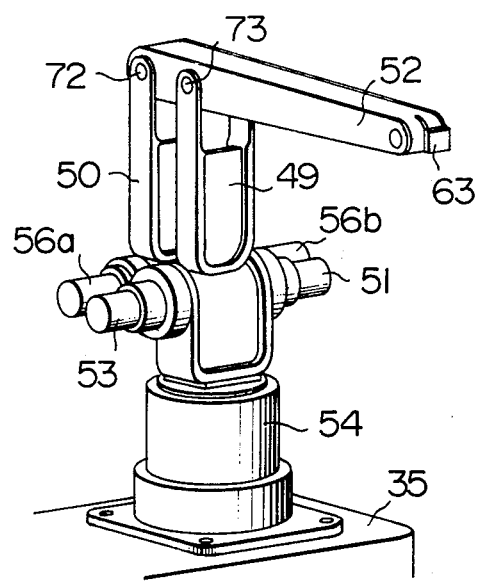
FIG. 4 is a perspective view of a small-sized articulated robot incorporated in the system shown in FIGS. 2 and 3.
Figure 5:
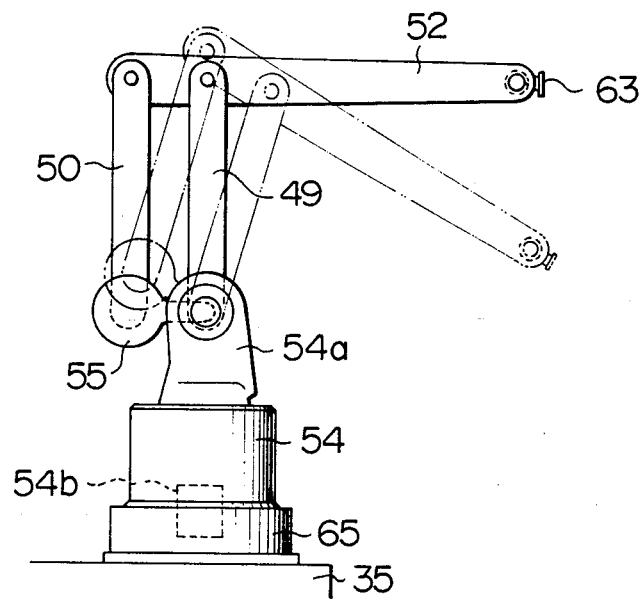
FIG. 5 is a front elevational view of the articulated robot as shown in FIG. 4.
Figure 6:
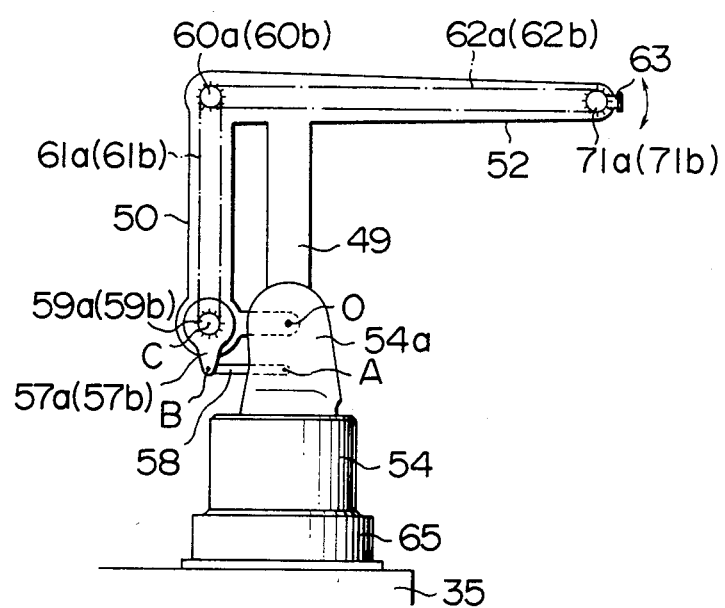
FIG. 6 is an illustration of a control system for controlling the wrist of the robot as shown in FIG. 4.
Figure 7:
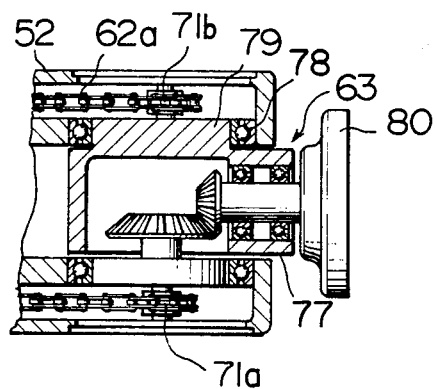
FIG. 7 is a sectional view showing the practical form of the wrist attached to the end of a forearm of the robot shown in FIG. 4.

The invention will be more fully described hereinunder through preferred embodiments with reference to the accompanying drawings. FIGS. 2 and 3 show a basic construction of an assembling or processing system in accordance with the invention. Namely, the assembling and processing system of the invention includes a small-sized articulated robot 31 for light weight adapted to perform handling and assembling of parts, a hand 32 attached to the end of the small-sized articulated robot 31 and adapted to grip the parts, a balancer 33 adapted to hold heavy loads, and a hand holder 34 attached to an end of the balancer and connecting the robot 31 and the balancer 33 to each other and also for holding the hand 32.

The small-sized articulated robot 31 for light weight has a multiplicity of degrees of freedom (at least 5 degrees of freedom) and is capable of performing complicated action. The robot 31 has a play back function, and is carried by a truck 35 which is adapted to run along guide rails 36, so that the robot is movable to a station 37a for supplying the light-weight parts, station 37b for supplying heavy-weight parts, working station 40 and an assembling station 39, in order to handle a large variety of parts. A plurality of hands 32 easily attachable to the small-sized articulated robot 31, corresponding to various kinds of parts to be handled, are mounted on the truck 35 of the small-sized articulated robot 31 for light weight. When the robot 31 handles a light-weight part, a hand 32 suitable for gripping this part is attached to the robot directly. If necessary, the hand 32 is exchanged by means of the hand holder 34 of the balancer 34. The robot 31, therefore, can handle a large variety of parts of different weights and sizes.

For handling heavy-weight parts, the small-sized articulated robot 31 grips the hand holder 34 and drives the balancer 33 through the hand holder 34. Then, the hand holder is moved to the position of the desired hand 32 to make the hand holder 34 grip the hand 32. Then, the small-sized articulated robot 31 drives the balancer 33 gripping the hand 32 to the heavy-weight part supplying station 37b to permit the hand 32 carried by the hand holder 34 attached to the end of the balancer 33 to grip and carry a predetermined heavy-weight part. Then, the robot moves to a predetermined assembling position (assembling station) 39 to mount the heavyweight part on a half-finished assembly situated at the assembling station 39. When a processing is to be made to the part, e.g. an application of oil, tightening of screws, caulking, brazing or the like, irrespective of whether the part is heavy or light, the small-sized articulated robot performs such a work using devices such as jigs prepared at the working station 40, before making the assembling at the assembling station 39.

As will be understood from the foregoing description, according to the invention, the parts of a weight exceeding the carrying capacity of the small-sized articulated robot 31 is carried by the balancer 33, while parts of weight below the carrying capacity of the small-sized articulated robot are carried and handled solely by the robot 31.

Referring to FIG. 3, a radius $R_A$ represents the range of work of the balancer 33, while a symbol P shows the position where the hand holder 34 of the balancer 33, which is set by a setting member 98 on a pillar 97, is connected to the end of the small-sized articulated robot 31.

As stated before, the small-sized articulated robot 31 is mounted on a truck 35 which is self-driven along the guide rails 36 to the stations 37a, 37b, 39 and 40, as well as to the position opposing to the balancer 33. The detail of this robot 31 will be described hereinunder with specific reference to FIGS. 4 thru 7. A reference numeral 65 denotes a base member attached to the truck 35. A turret 54 is mounted on the base member 65 for rotation around a vertical axis by the power which is transmitted through a reduction gear from a driving motor (not shown) provided on the base member 65, thereby to provide one degree of freedom of movement of the articulated robot. A reference numeral 49 designates a first upper arm supported on the upper part 54a of the turret 54 for rotation around an axis 0. The first upper arm 49 is connected to the output shaft of a driving motor 51 through a reduction gear. A second upper arm 50 is extended in parallel with the first upper arm 49. A crank lever 55 is supported on the upper part 54a of the turret 54 for rotation around an axis 0, and is connected to the output shaft of a driving motor 53 through a reduction gear. A fore arm 52 is rotatably connected to the free ends of the first and second upper arms 51, 50 so as to extend in parallel with the crank lever 55. Thus, the rotation of the first upper arm 49 around the axis 0, caused by the driving motor 51, constitutes one degree of freedom of the articulated robot, while the tilting motion of the forearm 52, caused by the driving motor 53, constitutes one degree of freedom.

An explanation will be made hereinunder as to the mechanism for driving the wrist 63. Wrist driving motors 56a, 66b are fixed to members 57a, 57b which are rotatably supported by the free end of the crank lever 55, at the point of pivotal connection between the crank lever 55 and the second upper arm 50. A link 58 is rotatably connected at its one end to a point A on the turret 54 while the other end of the same is pivotally connected to the free ends B of the members 57a, 57b. The crank lever 55 and the link 58 are extended in parallel with each other, while the members 57a, 57b are extended in parallel with a line interconnecting points A and O on the turret 54, thereby to constitute a parallel link mechanism. Sprocket wheels 59a, 59b are connected to the wrist driving motors 56a, 56b through reduction gears, and are rotatably held by the free end of the crank lever 55. Reference numerals 60a, 60b designate sprocket wheels which are rotatably carried by the pivotal connection between the second upper arm 50 and the fore arm 52, while reference numerals 71a, 71b designate sprocket wheels rotatably carried by the pivotal connection between the fore arm 52 and the wrist 63. Flexible links 61a, 61b such as chains are connected between the sprocket wheels 59a, 59b and the sprocket wheels 60a, 60b to constitute a parallel link mechanism, while flexible links 62a, 62b such as chains are connected between the sprocket wheels 60a, 60b and sprocket wheels 71a, 71b to constitute a parallel link mechanism. The combination of sprockets and chains are arranged in duplicate as indicated by the suffixes a and b, in order to swing the wrist 63 in the directions of arrows shown in FIG. 6 and to twist the wrist 63 around its axis. The rotations of the output shafts of the wrist driving motors 56a, 56b are transmitted to the sprocket wheels 59a, 59b through reduction gears to drive the links 61a, 61b. The movements of the links 61a, 61b are then transmitted to the sprocket wheels 60a, 60b to rotate the latter. The rotations of these sprocket wheels 60a, 60b are then transmitted to the links 62a, 62b thereby to swing the wrist vertically as indicated by arrows and to rotate or twist the same around its own axis. The stationary parts of the wrist driving motors 56a, 56b are rotatably secured to the free end of the crank lever 55 through respective bearings. The free ends B of these parts 57a, 57b are rockably secured to the upper part A of the turret 54 through a link 58. The points O, A, B and C on the turret form a parallelogram so that the lines, $\overline{OA}$, $\overline{AB}$, $\overline{BC}$ and $\overline{CO}$ constitute a parallelogram link mechanism with the side $\overline{OA}$ serving as the stationary side. Also, the sprocket wheels 59a, 59b, 60a, 60b and the links 61a, 61b constitute parallel link mechanisms. Also, the sprocket wheels 60a, 60b, 71a, 71b and the links 62a, 62b constitute parallel link mechanisms.

This arrangement offers the following advantage. Namely, even if the positions of the wrist driving motors 56a, 56b are changed as a result of the movement of the second upper arm 50 for tilting the fore arm 52, the rotational positions of the sprocket wheels 59a, 59b, 60a, 60b, 71a, 71b are not changed relatively to the stationary side $\overline{OA}$ unless the wrist driving motors 56a, 56b are activated, so that a constant posture of the wrist 63 is maintained. Namely, the wrist 63 can take a constant posture without requiring any specific control, regardless of the postures of the first upper arm 49 and the fore arm 52.

The wrist 63 is constituted by a cylinder 79 integral with the sprocket wheel 71b and rotatably supported by a bearing 78', and a member 80 rotatably supported by the cylinder in the axial direction through a bearing 7. A bevel gear fixed to the member 80 meshes with a bevel gear attached to the rear end of the sprocket wheel 71a. Therefore, when the wrist driving motor 56a is activated alone, the wrist 63 is twisted around its axis, while, when the wrist driving motor 56b is energized alone, the cylinder 79 is rotated to bend the wrist 63.

Figure 8:
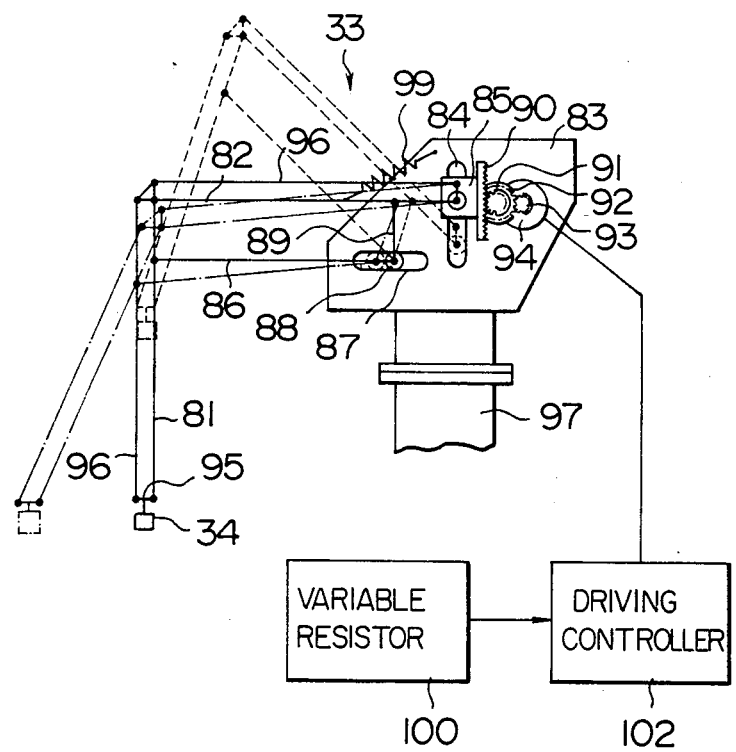
FIG. 8 is an illustration of a balancer incorporated in the system shown in FIGS. 2 and 3.
Figure 9:
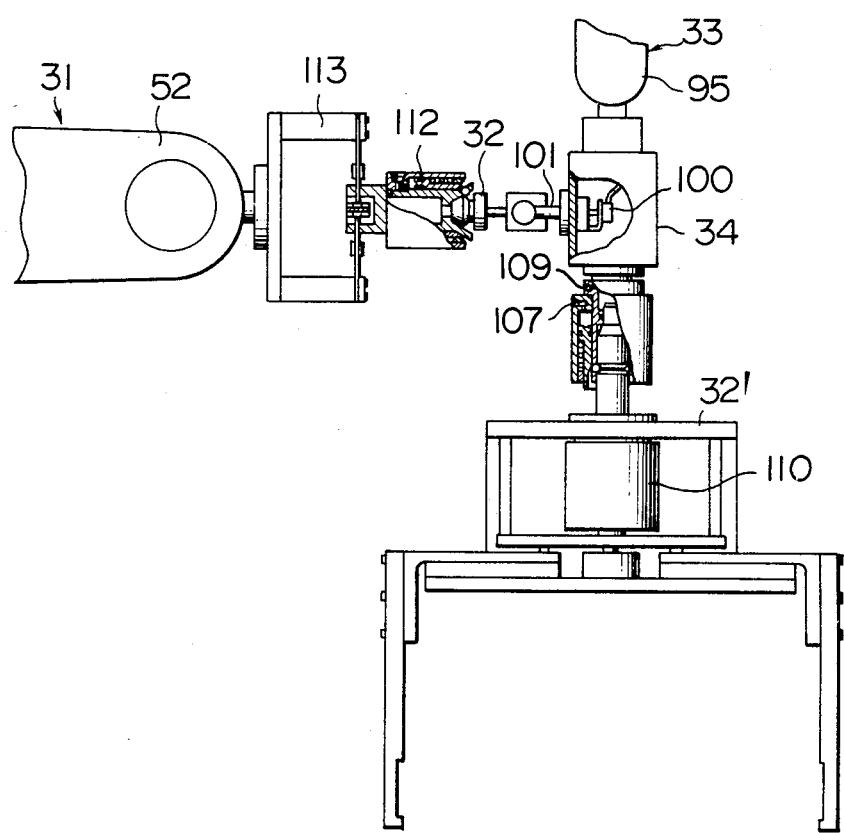
FIG. 9 shows the small-sized articulated robot in a state connected to the balancer.
Figure 10:
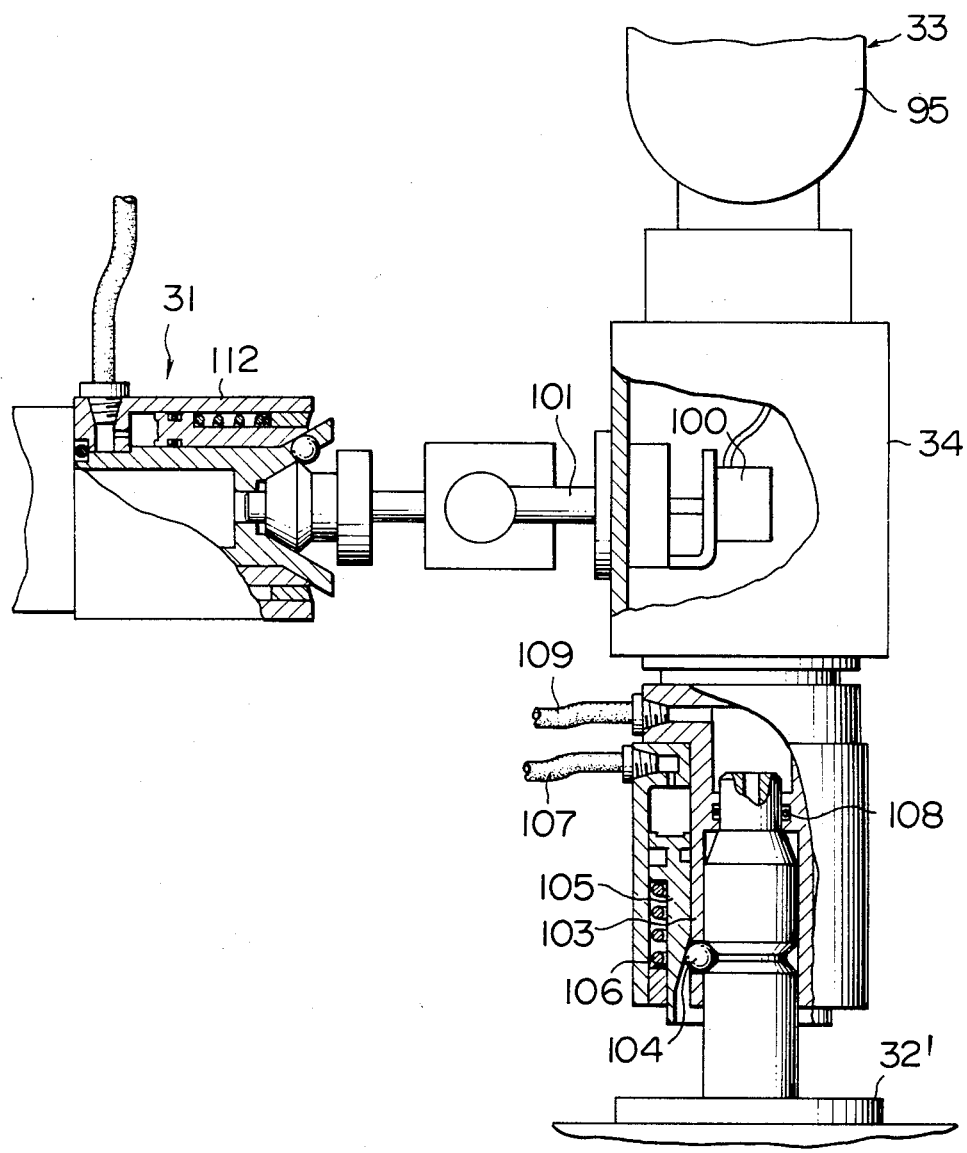
FIG. 10 is an enlarged view of a major part of the assembly shown in FIG. 9.

FIG. 8 shows the detail of the balancer 33. The aforementioned hand holder 34 is secured to the lower end of an arm 81. An upper arm 82 is connected at its one end rotatably to the upper end of the arm 81, while the other end of the same is pivotally connected to a moving block 85 which is slidable up and down along a guide groove 84 formed in the frame 83. A lower arm 86 is connected at its one end rotatably to a portion of the arm 81 near the upper end of the latter, while the other end is pivotally connected to a roller adapted to slide to the left and right along a guide groove 87 formed in the frame 83. The upper and lower arms 82 and 86 are arranged to extend in parallel with each other. Another arm 89 is connected rotatably at its upper end to the upper arm 82 and at its lower end to the above-mentioned roller 88. The arm 89 is arranged to extend in parallel with the first-mentioned arm 81. A rack 90 formed on the right-side end portion of the moving block 85 is engaged by a engaged by a pinion 91 which is drivingly connected to a driving motor 94 through gears 92, 93. A link 95 rotatably supported by the lower end of the arm 81 and fixedly carrying the hand holder 34 is connected to the above-mentioned moving block 85 by means of a parallel mechanism, so that the hand holder 34 can maintain a constant posture.

A spring 99 is adapted to maintain the roller 88 at the neutral position. Also, a frame 83 is rotatably carried by the upper end of a pillar 97 which is provided with a setting number 98 for setting the hand holder 34 at a predetermined position as shown in FIG. 2. This setting member 98, however, is disposed at a position out of the range of operation.

A rotary type variable resistor 100 attached to the hand holder 34 is adapted to be reset by means of a spring or the like, and has an input shaft 101. At the lower side of the hand holder 34, provided are various constituents for detachably holding the hands 32′ for heavy-weight parts. These constitutents are a hand holding cylinder 103, hand fixing ball 104, ball fixing piston 105, piston resetting spring 106, piston-driving air inlet 107, hand locating guide (not shown), "O" ring 108, and an air inlet port 109 to a cylinder 110 for driving the hand 32′ for heavy-weight parts. The hand 32′ is driven by the pneumatic cylinder 110 to clamp or grip the heavy-weight parts.

The balancer 33, therefore, can freely move in the horizontal direction while carrying a heavy-weight part, as the hand holder 34 is moved in the horizontal direction. In addition, as the input shaft of the rotary variable resistor 100 is rotated in, for example, clockwise direction, an output corresponding to the rotation direction and rotation angle is delivered to a driving controller 102 so that the latter delivers a signal for activating the driving motor 94 thereby to lower the moving block 85 to lift the hand holder 34. To the contrary, as the input shaft 101 of the resistor 100 is rotated counter-clockwise, the drive controller 102 receives a signal corresponding to the rotation direction and rotation angle so that the driving motor 94 acts to lower the hand holder 34.

Thus, according to the invention, it is possible to produce at an extremely low cost an industrial robot having the minimum required function, incorporating the balancer 33 which can freely move in the horizontal plane while the vertical movement is effected by inputting a command through the input shaft 101 of the rotary resistor 100 thereby to move the heavy-weight parts up and down.

The wrist 63 of the industrial robot 31 has a force sensor adapted to sense the vertical displacement of the wrist 63 irrespective of the angle of twisting of the wrist around the axis thereof. The hand 32 is adapted to be attached to the end 112 of the force sensor 113. Rotary encoders for detecting the rotation angle are attached to the driving motors 51, 53, 56a, 56b. These encoders deliver the outputs to a microcomputer (not shown) which is adapted to make an arithmetic operation in accordance with a predetermined program and to deliver a signal in accordance with the result of the arithmetic operation for driving these motors 51, 53, 56a, 56b through a driving circuit which is not shown, so that the end 112 of the sensor can be moved precisely along a predetermined locus or path.

In operation for assembling a heavy-weight part, a hand 32 capable of gripping the input shaft 101 of the hand holder 34 of the balancer 33 is attached to the end 112 of the small-sized articulated industrial robot 31. Then, after moving the truck 35 to locate the small-sized articulated robot 31 at a position confronting the balancer 33 to make the hand 32 grip the input shaft 101 on the hand holder 34 which has been set at a predetermined position by the setting member 98.

As the small-sized articulated robot 31 moves in the horizontal plane, it imparts a force to the hand holder 34 to move the balancer 33 to any desired position in the horizontal plane, while the vertical movement of the balancer 33 is caused by twisting the wrist 63 around the axis thereof to rotate the input shaft 101 clockwisely or counter-clockwisely to move the balancer 33 upwardly or downwardly. The twisting of the wrist 63 around the axis is controlled until the output from the force sensor 113 due to the vertical displacement becomes null, thereby to control the control driving circuit.

In consequence, the small-sized articulated robot is controlled in accordance with a program stored in a microcomputer (not shown). A hand 32′ for heavy-weight part is attached to the hand holder 34 of the balancer 33 to grip the heavy-weight part 38 prepared at the heavy-weight part supplying station 37a. The part is then conveyed to the working station where a predetermined work is conducted and is brought to the assembling station where it is mounted on a half-finished assembly located at this station.

The replacement of the hand 32 is made in the reverse procedure. Namely, after detaching the hand 32′ now on the hand holder, and a new handle is gripped and held by the hand holder moved to the position of the new hand.

The handling of light-weight parts is made in the followng manner. Namely, after setting the hand holder 34 of the balancer 33 by the setting member 98 to the position P, the hand releases the input shaft 101 to disconnect the small-sized articulated robot 31 from the balancer 33. Then, the small-sized articulated robot is moved together with the truck 35 along the guide rails 36 and holds a predetermined handle 32 at the end 112 of the robot. The robot then handles the light-weight part to perform assembling or processing of the part in accordance with the program stored in the microcomputer.

Thus, in the assembling or processing system of the invention, the small-sized articulated robot is disengageably connected to the hand holder 34 of the balancer 33 which has a simple construction and a single function to carry the heavy-weight load. The control of position of the hand held by the hand holder 34 of the balancer 33 is achieved by the robot itself, while the heavy weight of the part is born by the balancer. In consequence, it is possible to perform complicated assembling or processing work with a large variety of parts including light-weight parts and heavy-weight parts, by a single small-sized articulated robot which is less-expensive than ordinary robot capable of handling heavy weight.

The conventional articulated industrial robot designed to handle heavy-weight parts, as well as light-weight parts, is very expensive. It is remarkable that, according to the invention, the production cost of the assembling or processing system is reduced to about a half of that of the conventional system incorporating a large-sized articulated robot capable of handling a large weight, thanks to the combination of the small-sized articulated robot and the balancer.

There are two ways in achieving an automatic control of the vertical movement of the balancer 33. One is to rotate the input shaft 101 of the rotary resistor 100 on the balancer 33 as described, while the other is to operate the balancer by directly inputting to the driving controller 102 of the balancer a speed instruction signal equivalent to a speed signal generated as the rotary resistor 100 is rotated.

In the former way of control, the small-sized articulated robot 1 is required to have at least four degrees of freedom, i.e. three degrees of freedom of positions of the wrist and one degree of freedom for twisting the wrist, while, in the latter way, the robot is required to have only three degrees of freedom for controlling the position of the wrist.

Figure 11:
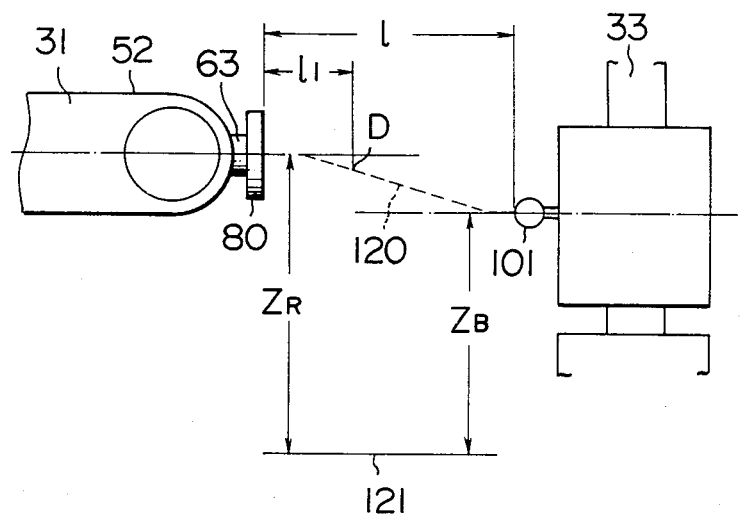
FIG. 11 is an illustration of the principle of operation of the sensor.

An explanation will be made hereinunder as to the principle of the sensor 113 for sensing the positional difference in the vertical direction between the small-sized articulated robot and the balancer 33, with specific reference to FIG. 11. Imagine here that a beam 120 is fixed at its both ends to the member 80 of the wrist 63 and the input shaft 101 of the balancer 33. A deflection of the beam 120 is caused by the difference $\Delta Z$ between the height of the beam end connected to the member 80 from the reference plane 121 and the height of the beam end connected to the input shaft 101 from the same reference plane 121. There is a proportional relationship between the height difference $\Delta Z$ and the level of stress $\sigma$ appearing in the beam surface at a point D spaced by a distance $l_1$ from the fixed end of the beam 120, as expressed by the following equation:

$$\sigma = \frac{3E(2l_1 - l)h}{l^3} \Delta Z \quad (1)$$

where, l represents the length of the beam 120, E represents the modulus of longitudinal elasticity and h represents the beam thickness.

It is therefore, possible to detect the relative position or positional difference in the vertical direction between the small-sized articulated robot 31 and the balancer 33, by measuring the strain caused by this stress, by means of a strain gauge attached to the point D. The sensor 113 may be fixed either to the member 80 on the wrist of the articulated robot 31 or to the input shaft 101 on the balancer 33. On the other hand, there are two ways of control of the vertical movement of the balancer as stated before. In consequence, there are four types of combination of the way of attaching of the sensor 113 and the way of control of the vertical position, as summarized below.

(1) The sensor 113 is attached to the member 80 on the wrist and the balancer 33 is operated through the twisting action of the wrist.
(2) The sensor 113 is attached to the member 80 on the wrist and the balancer 33 is operated through a direct input of the speed instruction signal to the driving controller 102.
(3) The sensor 113 is fixed to the input shaft 101 and the balancer 33 is operated through the twisting action of the wrist.
(4) The sensor 113 is fixed to the input shaft 101 and the balancer 33 is operated through a direct input of the speed instruction signal to the driving controller 102.

In the first case (1) mentioned above, the sensor 113 also is rotated as a result of the twisting of the wrist. It is therefore, necessary to adopt a construction capable of compensating for the influence of the rotation of the sensor 113, resulting in a complicated construction. In the case (2) mentioned above, the wrist is not operated, while in the cases (3) and (4), the rotation of the wrist provides no substantial effect. It is, therefore, not necessary for adopting the construction for compensating for the influence of rotation of the sensor 113, in the cases (2), (3) and (4). In these cases, accordingly, it is possible to directly apply the principle stated before.

Figure 12:
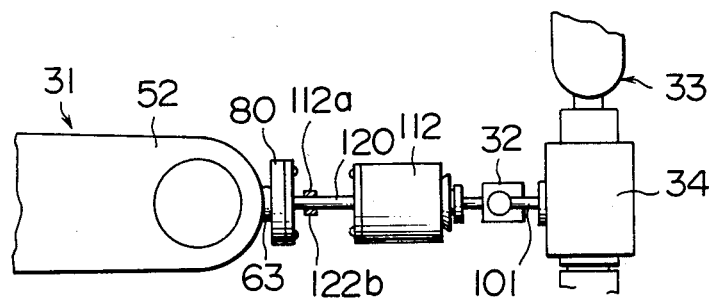
FIGS. 12, 13 and 14 are illustration of different embodiments with sensors connected between the robot and the balancer.
Figure 13:
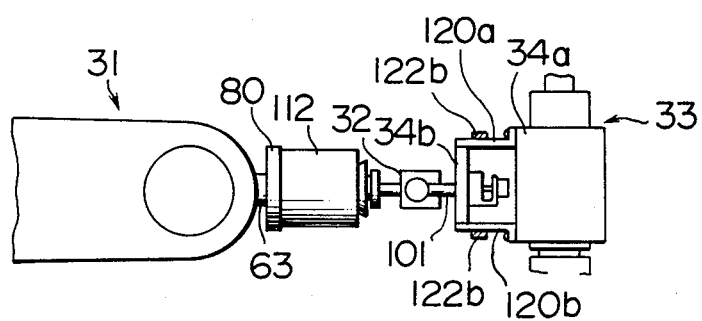
Figure 14:
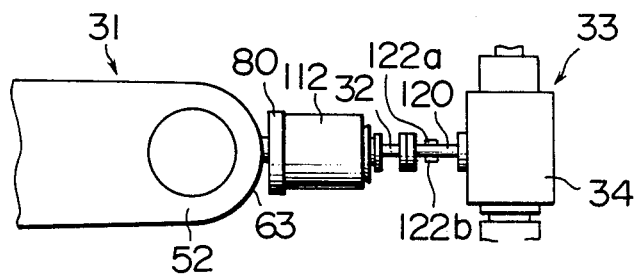

An embodiment constructed in accordance with the case (2) mentioned above is shown in FIG. 12, while another embodiment arranged in accordance with the cases (3) and (4) are shown in FIG. 13.

Referring first to FIG. 12, the sensor 113 is composed of a beam 120 and a strain gauge. Preferably two strain gauge elements are attached to the upper and lower sides of the beam 120, in order to eliminate the influence of temperature. The beam 120 is fixed at its one end to the member 80 of the wrist and at its other end to the chuck 112 which is adapted to clamp a connecting member 32 fixed to the input shaft 101 on the balancer 33 thereby to couple the small-sized articulated robot 31 and the balancer 33. It is possible to directly connect one end of the beam 120 to the balancer without the medium of the chuck 112. The connection, however, is made preferably by way of the chuck 112, from a view point of safety and for permitting the independent functioning of the small-sized articulated robot. The connecting member 32 may be fixed directly to the hand holder 34.

Referring now to FIG. 13 showing another embodiment, the sensor 113 is constituted by beams 120a, 120b and strain gauges 122a, 122b. The beams 120a, 120b are connected at their one ends to the hand holder 34a, and at their other ends to the hand holder 34. In this case, a slight modification of the hand holder 34b is necessary. The small-sized articulated robot 31 and the balancer 33 are connected to each other by means of a chuck 112 fixed to the member 80 and a connecting member 32 to the input shaft 101. In the third case (3) mentioned above, i.e. in the case where the balancer 33 is operated through the manipulation of the input shaft 101, it is necessary to connect the connecting member 32 to the input shaft 101 as illustrated in FIG. 13. However, in the fourth case (4) in which the speed command signal is directly delivered to the driving controller 102, it is possible to fix the connecting member directly to the beam 120.

An explanation will be made hereinunder as to the control means for controlling the system of the invention constituted by the small-sized articulated robot 31, balancer 33 and the positional difference sensor 113.

Figure 15:
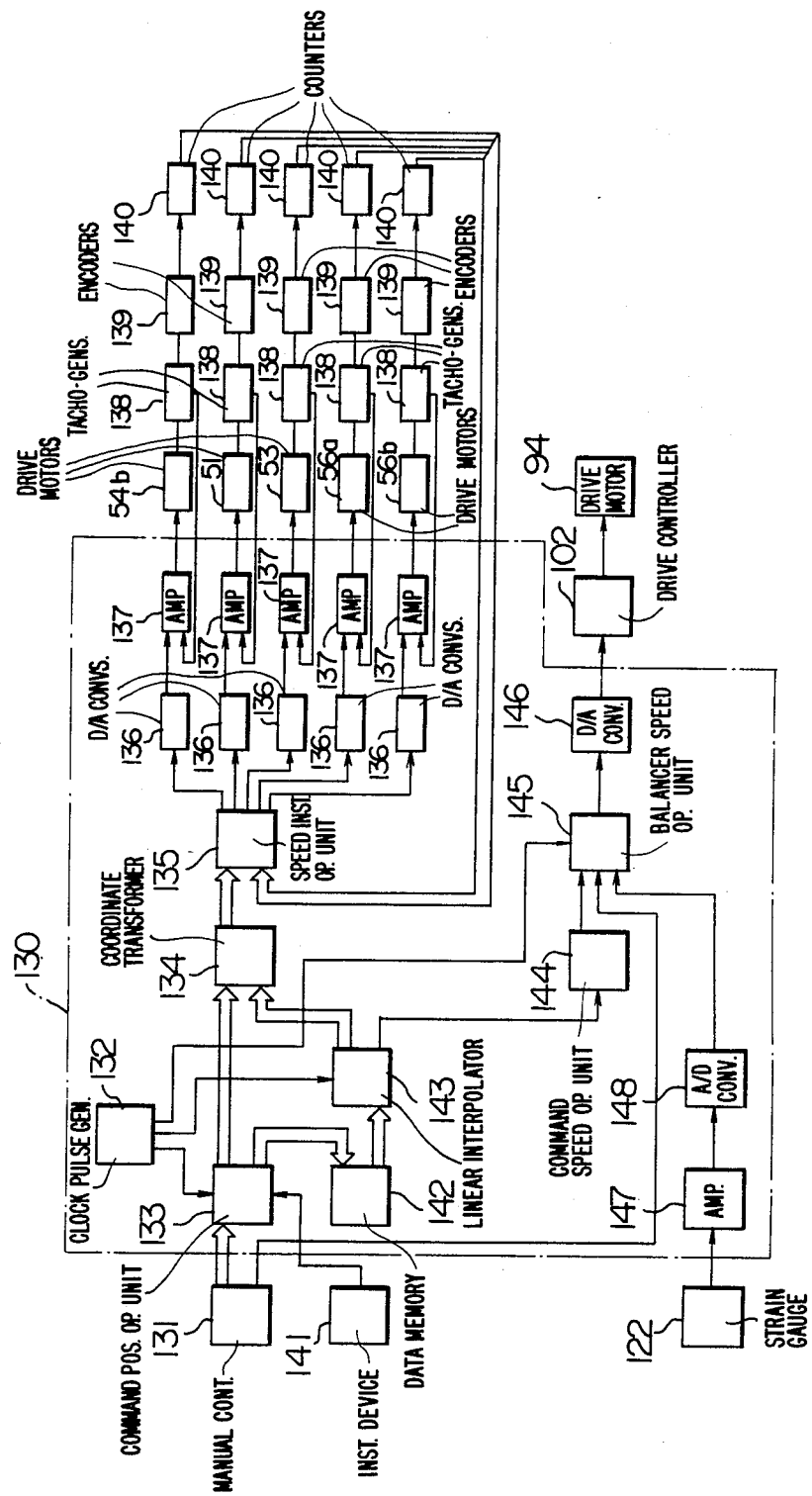
FIGS. 15 and 16 are illustrations of examples of a controller used in the assembling or processing system of the invention.

Referring first to FIG. 15 showing the control means applied to the case where the balancer 33 is operated by a direct input of the speed instruction to the driving controller 102, when the system is controlled manually by an operator, the operator inputs the speed instruction in the direction of each axis of coordinate from a manual controller. The controller 130 for controlling the small-sized articulated robot 31 and the balancer 33 includes a clock pulse generator 132 and a command position operation unit 133 adapted to be triggered by the pulse periodically delivered by the clock pulse generator 132. The command position operation unit 133 calculates the command position of the wrist 63 of the small-sized articulated robot 31, through integrating the speed instructions given by the manual controller 131. The calculated command position is then converted by a coordinate transformer 134 into a command rotation angle $\theta_{1i}$ of the turret driving motor 54$b$, command rotation angle $\theta_{2i}$ of the motor 51 for driving the upper arm 49 and a command rotation angle $\theta_{3i}$ of the motor 53 for driving the fore arm 52. A counter 140 is adapted to count the pulses from the encoders connected to the motors, thereby to calculate the actual rotation angles of the motors. The actual rotation angles thus measured and the above-mentioned command rotation angles are delivered to a speed instruction operation unit 135 adapted to produce a speed instruction which is delivered to a motor driving amplifier 137 through a D/A converter 136. The command rotation angles $\theta_{4i}$ and $\theta_{5i}$ of the wrist driving motors 56$a$, 56$b$ are maintained constant in order to keep the wrist in a constant posture.

Representing the actual rotation angles of the motor shafts by $\theta_{10}$, $\theta_{20}$, $\theta_{30}$, $\theta_{40}$ and $\theta_{50}$, the speed instruction values $V_1$, $V_2$, $V_3$, $V_4$ and $V_5$ delivered to the motors 54$b$, 51, 53, 56$a$, 56$b$ are derived from the following equation (2).

$$V_j = K_{1j}(\theta_{ji} - \theta_{jo}) \tag{2}$$

(j=1, 2, 3, 4, 5), where $K_{ij}$ represents a constant.

The speed instruction are delivered to the motor driving amplifier through an D/A converter 136. The motor driving amplifier 137 controls the motors by feeding back the speed obtained from tacho-generators 138 directly connected to the motors, thereby to actuate the small-sized articulated robot 31.

The command position calculated from the command position operation unit 133 is stored in a data memory device 142, in accordance with a position memorizing instruction given by the operator through an instruction device 141, and is utilized as the coordinate data of the command position when the robot operation is reproduced automatically.

A balancer speed instruction operation unit 145 operates in accordance with the pulse from the clock pulse generator 132. The balancer speed instruction operation unit 145 calculates the speed instruction $V_B$ of the balancer in accordance with the following equation (3), from the vertical speed instruction $V_Z$ delivered by the manual controller 131, and the value $\Delta Z$ which is derived from the strain in the strain gauge 122 of the sensor 113 through a strain amplifier 147 and an A/D converter 147.

$$V_B = K_2 V_z + K_3 \Delta Z + K_4 \frac{d}{dt} \Delta Z + K_5 \int \Delta Z dt \tag{3}$$

where, $K_2$, $K_3$, $K_4$ and $K_5$ are proportion constants. The speed instruction $V_z$ is an instruction which is delivered commonly to both of the small-sized articulated robot 31 and the balancer 33. Therefore, the control can satisfactorily be made solely by the term of $K_2 V_z$, provided that the small-sized articulated robot 31 and the balancer 33 have an equal speed response characteristics and that the inside model of the small-sized articulated robot 31, i.e. the horizontal plane imagined by the coordinate transformer 134, coincides with the horizontal plane of the balancer 33, namely, if no positional difference in the vertical direction is caused between the balancer 33 and the robot 31 when the latter is moved in a horizontal plane. Therefore, generally, the steady deviation of position is infinite is the control is made solely by the term of $K_2 V_z$. The correction term $K_3 \Delta Z$ made by the feed back of the value $\Delta Z$ is necessary for limiting the steady deviation. The term of $K_4 d/dt \Delta Z$ is effective in promoting the response of the balancer to the correction by the term $K_3 \Delta Z$. The term of $\Delta Z dt$ is effective in nullifying the steady deviation.

The driving motor 94 of the balancer 33 is activated as the balancer speed instruction $V_B$ is delivered through the D/A converter 146 to the balancer driving controller 102, so that the balancer 33 moves following up the movement of the small-sized articulated robot.

An explanation will be made hereinunder as to the procedure of automatic reproduction of operation for moving the system to a command position memorized in the data memory device 142 in accordance with the instruction from the instructing device 141.

After reading the coordinate values of the final command position from the data memory device 142, a linear interpolation is made by a linear interpolator 143 to determine the instent command points for permitting the small-sized articulated robot to be moved linearly between the starting position and the final command point read out from the memory device. This interpolation is made successively in accordance with pulses coming from the clock pulse generator 132. The successive command points thus obtained are transformed by the coordinate transformer into command rotation angles of the motor shafts, which are then delivered to the speed instruction operation unit 135 adapted to deliver the speed instruction in accordance with which the small-sized articulated robot 31 is controlled. On the other hand, the command points determined by the linear interpolator 143 are put into the command speed operation unit 144 adapted to determine the difference between the successive command points to calculate the vertical speed instruction $V_z$. The vertical speed instruction $V_z$ and the value $\Delta Z$ derived from the strain gauge 122 of the sensor 113 through the strain amplifier 147 and the A/D converter 148 are put into the balancer speed instruction operation uniz 145 which calculates the balancer speed instruction $V_B$. This instruction $V_B$ is delivered through the D/A converter 146 to the balancer driving controller 102 thereby to activate the driving motor 94 of the balancer 33. In consequence, the balancer 33 moves following up the movement of the small-sized articulated robot 31.

Figure 16:
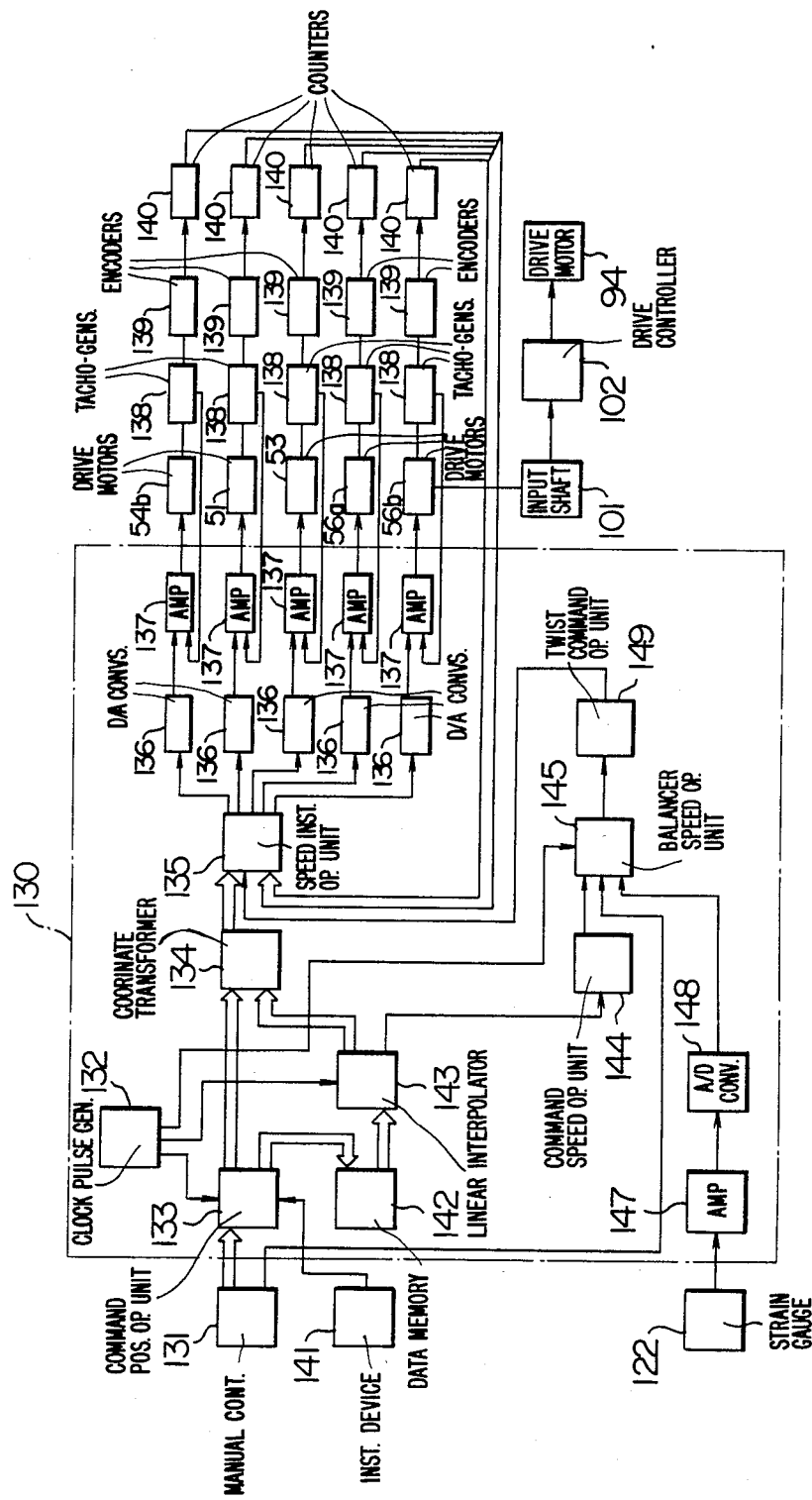

Hereinafter, the control means for operating the balancer 33 through a twist of the wrist 63 will be explained with specific reference to FIG. 16. When the control of the system is made manually by an operator, the command position operation unit 133 is actuated by the pulse coming from the clock pulse generator 132 to integrate the speed instructions delivered by the manual controller 131 thereby to calculate the command position of the wrist 63. This command position is converted by the coordinate transformer into the command rotation angle $\theta_{1i}$ for the motor 64$b$ for driving the turret 64, command rotation angle $\theta_{2i}$ for the motor 51 for driving the upper arm 49 and a command rotation angle $\theta_{3i}$ for driving the fore arm 50. The data of the command position are stored in the data memory device 142 in accordance with a memorizing instruction given by the operator through the instructing device 141. On the other hand, the balancer speed instruction operation unit 145 is activated by the pulse from the clock pulse generator 132, and calculates the balancer speed instruction $V_B$ using the vertical speed instruction $V_Z$ delivered by the manual controller 131, as well as the value $\Delta Z$ which is derived from the strain gauge 122 of the sensor 113 through the strain amplifier 147 and the A/D converter 148.

A twist command operation unit 149 is adapted to calculate the command rotation angle $\theta_{4i}$ of the motor 56a for twisting the wrist 63, from the balancer speed instruction $V_B$, in accordance with the following equation (4) in which $K_6$ represents a constant.

$$\theta_{4i} = K_6 V_B \tag{4}$$

The speed instruction operation unit 135 calculates, using the command values $\theta_{1i}, \theta_{2i}, \theta_{3i}, \theta_{4i}$ and the actual rotation angles of respective motors obtained through the counter 140 counting the pulses from the encoders 139 directly connected to the shafts of respective motors, the speed instruction which is to be delivered to the motor driving amplifier 137 through the D/A converter 136. The command rotation angle for the wrist driving motor 56b is maintained constant in order to maintain a constant posture of the wrist in the vertical plane. The speed instructions to be delivered to the motors 54b, 51, 53, 56a, 56b are calculated in accordance with the equation (2) mentioned before. These speed instructions are delivered through the D/A converter to a motor driving amplifier 137 to activate respective motors, thereby to operate the small-sized articulated robot 31. At the same time, the wrist 63 is twisted to manipulate the input shaft 101 on the balancer 33 so that the balancer 33 is operated to follow up the motion of the articulated robot 31.

An explanation will be made hereinunder as to the means for automatically reproducing the operation of the system to the command position stored in the data memory device 142 in the above-described procedure. The linear interpolator 143 is activated by the pulse from the clock pulse generator 132 to make a linear interpolation between the starting position and the final command position derived from the data memory device 142, thereby to calculate the successive instant command points. The command points are transformed into the command rotation angles of respective motors for driving the turret 54, upper arm 49 and the fore arm 62. At the same time, the command points are delivered to the speed command operation unit 144 which calculates the vertical speed instruction $V_z$. The balancer speed instruction operation unit 115 calculates the balancer speed instruction $V_B$, using the above-mentioned speed instruction $V_Z$ and the value $\Delta Z$ which is derived from the strain gauge 122 of the sensor 113 through the strain amplifier 117 and the A/D converter 118. The balancer speed instruction $V_B$ thus determined is then transformed into the command rotation angle $\theta_{4i}$ of the motor 31a for effecting the twist of the wrist 30.

The speed instruction operation unit 105 effects a servo control in response to the above-mentioned command value, thereby to control the motors of respective axes of the small-sized articulated robot 31. Furthermore, the input shaft 101 on the balancer 33 is rotated by the twisting of the wrist 63, so that the balancer 33 is operated to follow-up the movement of the small-sized articulated robot 31.

In the described embodiment, the control of the balancer is achieved by rotating the input shaft 101 of the rotary variable resistor 100 on the balancer 33. However, this arrangement is not exclusive. Namely, it is possible to obtain an equivalent effect by making use of the vertical swinging action of the wrist, insteadly of twisting, using a commercially available rotary resistor of the type having an input shaft 101 adapted to be rotated by a manipulation lever rockable in the circumferential direction of the rotary variable resistor 100.

The balancer incorporated in the system of the invention may be actuated by a hydraulic or pneumatic actuator, insteadly of the described electric actuator. In such a case, the balancer actuated hydraulically or pneumatically is combined with the robot in accordance with the control system of the second embodiment.

It will be clear to those skilled in the art also that the small-sized robot for light-weight parts need not always be an articulated robot, and an equivalent effect to that of the described embodiment is obtainable with a robot of rectangular coordinate type or cylindrical coordinate type.

As has been described, the present invention provides an assembling or processing system in which a single small-sized robot for light-weight parts is combined with a balancer, so that the system can handle a large variety of parts including light-weight parts and heavy-weight parts by a single small-sized robot. In consequence, this system makes it possible to automate the production process in which a large variety of products are produced at a small quantity. In addition, the system of the invention has a high flexibility to deal with various changes in the production process. Furthermore, the assembling or processing system of the invention can be produced at a much lower cost than the conventional system.

To sum up, the present invention offers the following advantages.

First of all, it is to be noted that the system of the invention permits a single small-sized robot for light weight parts to handle parts of heavy weights exceeding the carrying capacity of the robot, thanks to the combination of the small-sized robot for light-weight parts and a balancer capable of carrying parts of heavy weights, in such a manner that the position of the balancer is controlled by the robot and the operation speed of the balancer is adjusted in accordance with a position deviation signal derived from a sensor provided between the robot and the balancer.

In consequence, it becomes possible to automatically assemble or process heavy parts with a simple system having only one industrial robot for light-weight parts.

Secondly, since the balancer can be produced at an extremely low cost, the system as a whole can be produced at a cost which is about a half or lower of the production cost of the conventional system incorporating an expensive robot capable of performing complicated task and carrying heavy load.

The assembling or processing system of the invention can easily be adopted in existing assembling or processing line for heavy parts simply by adding the robot for light-weight parts and a controller, provided that the existing line is equipped with a balancer.

What is claimed is:

1. An assembling or processing system comprising: a first industrial robot the end of which has at least three degrees of freedom for movement in horizontal and vertical planes; a second industrial robot the end of which has at least three degrees of freedom for movement in horizontal and vertical planes; connecting means for connecting the end of said first industrial robot to the end of said second industrial robot; a sensor provided on said connecting means and adapted to sense the positional deviation between the ends of said first and second industrial robots; and a controller for controlling the operation of said first and second industrial robots; wherein said first industrial robot is driven in accordance with an instruction from said controller, and said second industrial robot is controlled in accordance with a signal from said sensor to follow-up the movement of said first industrial robot.

2. An assembling or processing system comprising: an industrial robot whose end has at least three degrees of freedom for movement in horizontal and vertical planes; a balancer provided at its end with a chuck for clamping a part to be handled, said end having said chuck being adapted to be driven in the vertical direction by a power derived from a driving power source but movable freely in the horizontal directions; connecting means for connecting the end of said industrial robot to the end of said balancer; a sensor provided on said connecting means and adapted to sense the difference of vertical position between said end of said robot and said end of said balancer; and a controller adapted to control the operation of said industrial robot and said balancer; wherein the movement of said balancer in the horizontal plane is caused by the force produced and transmitted from said industrial robot, while the vertical movement of said balancer is achieved by making said balancer follow-up the vertical movement of said industrial robot by calculating a balancer speed instruction using both of a vertical speed command delivered by a vertical speed command generator provided in said controller and the difference of vertical position between said ends of said industrial robot and said balancer derived from said sensor, and then delivering said balancer speed instruction to a driving control circuit for said balancer, thereby to move said balancer vertically following-up the vertical movement of said industrial robot.

3. An assembling or processing system as claimed in claim 2, wherein said sensor includes a vertically deflectable beam, and a strain gauge attached to said beam.

4. An assembling or processing system as claimed in claim 2, wherein said industrial robot is constructed to have at least five degrees of freedom.

5. An assembling or processing system as claimed in claim 2, wherein said industrial robot is an articulated robot.

6. An assembling or processing system as claimed in claim 2, characterized by further comprising a chuck holder attached to the end of said industrial robot, said chuck being adapted to detachably hold a variety of hands.

7. An assembling or processing system as claimed in claim 6, wherein said industrial robot is carried by a truck adapted to run along a predetermined path.

8. An assembling or processing system as claimed in claim 7, wherein said truck is adapted to carry a variety of hands.

9. An assembling or processing system comprising: an industrial robot movable in horizontal and vertical planes and provided at its end with a wrist rockable around a horizontal axis, said robot thus having at least four degress of freedom; a balancer provided at its end with a chuck for holding a part to be handled, said end having said chuck being freely movable in the horizontal plane but being adapted be driven in the vertical direction by a power derived from a driving power source, said balancer having at its end with an input shaft for generating an instruction for activating said driving power source; connecting means for connecting the end of said industrial robot and said end of said balancer; a sensor provided on said connecting means and adapted to sense the difference of vertical position between said ends of said industrial robot and said balancer; and a controller adapted to control the operation of said industrial robot and said balancer; wherein the horizontal movement of said balancer is achieved by the force produced and transmitted from said industrial robot, while the vertical movement of said balancer is caused by making said balancer follow-up the vertical movement of said industrial robot by calculating a speed instruction for said balancer using both of a vertical speed command delivered by a vertical speed command generator provided in said controller and the difference in the vertical position between said ends of said industrial robot and said balancer sensed by said sensor, and driving said wrist of said industrial robot in accordance with said speed instruction to twist said input shaft on said balancer to cause a vertical movement of said balancer following-up the vertical movement of said industrial robot; whereby a part of a large weight carried by said balancer is handled by said industrial robot.

10. An assembling or processing system as claimed in claim 9, wherein said sensor includes a vertical deflectable beam and a strain gauge attached to said beam.

11. An assembling or processing system as claimed in claim 9, wherein said industrial robot is constructed to have at least five degress of freedom.

12. An assembling or processing system as claimed in claim 9, wherein said industrial robot is an articulated robot.

13. An assembling or processing system as claimed in claim 9, characterized by further comprising a chuck holder provided at the end of said industrial robot, said chuck holder being capable of detachably holding a variety of hands.

14. An assembling or processing system as claimed in claim 13, wherein said industrial robot is mounted on a truck movable along a predetermined path.

15. An assembling or processing system as claimed in claim 14, wherein said truck is adapted to mount a variety of hands.

16. An assembling or processing system as claimed in claim 1, wherein said sensor includes a deflectable beam, and a strain gauge attached to said deflectable beam.

17. An assembling or processing system as claimed in claim 1, wherein said first industrial robot is an articulated robot.

18. An assembling or processing system as claimed in claim 1, wherein said connecting means includes a chuck holder attached to the end of said first industrial robot, said chuck being adapted to detachably hold a variety of hands including a connecting hand.

19. An assembling or processing system as claimed in claim 18, wherein said first industrial robot is carried by a truck adapted to run along a predetermined path.

20. An assembling or processing system as claimed in claim 19, wherein said truck is adapted to carry a variety of hands.

21. An assembling or processing system as claimed in claim 1, wherein said sensor includes a deflectable beam, and a strain gauge attached to said deflectable beam provided on the end of said first industrial robot, and said connecting means includes a chuck holder attached to the end of said sensor, said chuck being adapted to detachably hold a variety of hands including a connecting hand.

* * * * *